Figure 1:
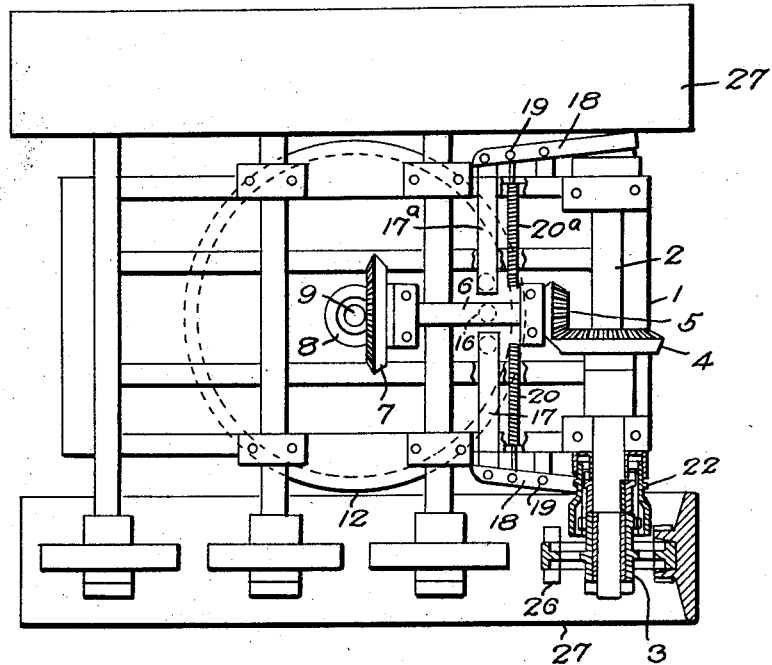

June 3, 1930.   C. H. LOTTE   1,761,267
POWER STEERING MACHINE
Filed Jan. 10, 1927   3 Sheets-Sheet 1

Inventor
Charles H Lotte
by Fay, Oberlin & Fay
Attorneys

June 3, 1930.  C. H. LOTTE  1,761,267
POWER STEERING MACHINE
Filed Jan. 10, 1927  3 Sheets-Sheet 2

INVENTOR.
C. H. Lotte
BY
ATTORNEY.

June 3, 1930. C. H. LOTTE 1,761,267
POWER STEERING MACHINE
Filed Jan. 10, 1927   3 Sheets-Sheet 3
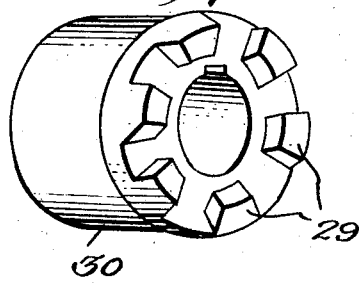
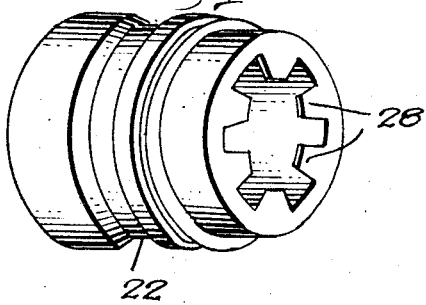
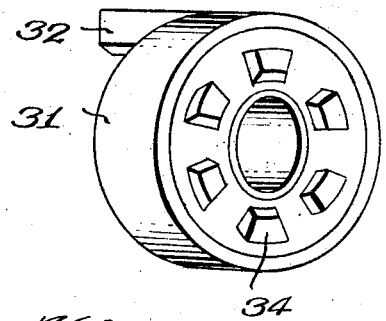
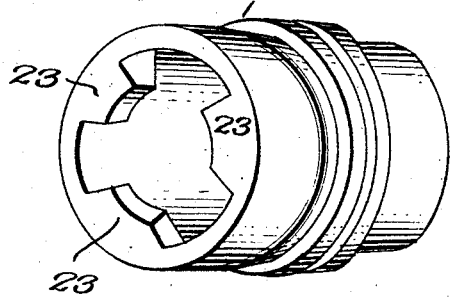
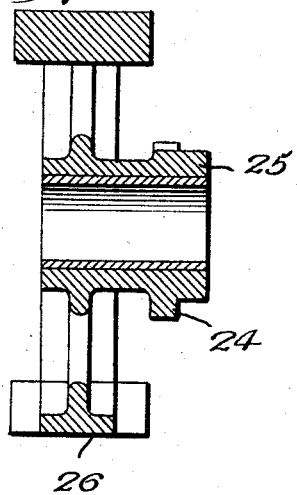
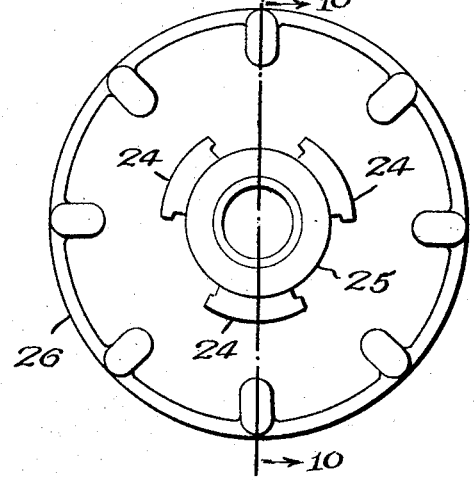
Inventor
Charles H Lotte
by Fay, Oberlin & Fay
Attorneys Patented June 3, 1930

1,761,267

UNITED STATES PATENT OFFICE

CHARLES H. LOTTE, OF MASSILLON, OHIO, ASSIGNOR TO BYERS MACHINE COMPANY, OF RAVENNA, OHIO, A CORPORATION OF MARYLAND

POWER STEERING MACHINE

Application filed January 10, 1927. Serial No. 160,170.

The invention relates to endless belt or crawler trucks of the type wherein there is a traction driving axle and a swiveled deck body, such as in power shovels, excavators, etc., adapted to travel independently of any track.

The object of the invention is to provide a truck of said type with a novel steering device by which to accomplish a long steering radius or to automatically lock either crawler belt in a stationary position to the truck whereby to accomplish a very short steering or turning radius, all under the direct control of the operator of the machine and thereby eliminate the use of intermediate devices controlled by a second attendant.

In the embodiment of the invention illustrated in the drawings, the invention is applied to the traction driving axle of a crawler or endless belt type of truck adapted for an excavating machine, but it is to be understood that the invention is applicable to various machines using a crawler truck capable of power steering.

Figure 2:
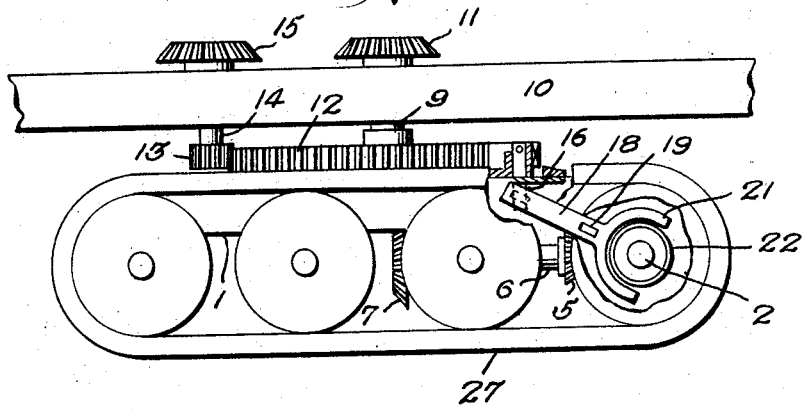
Figure 3:
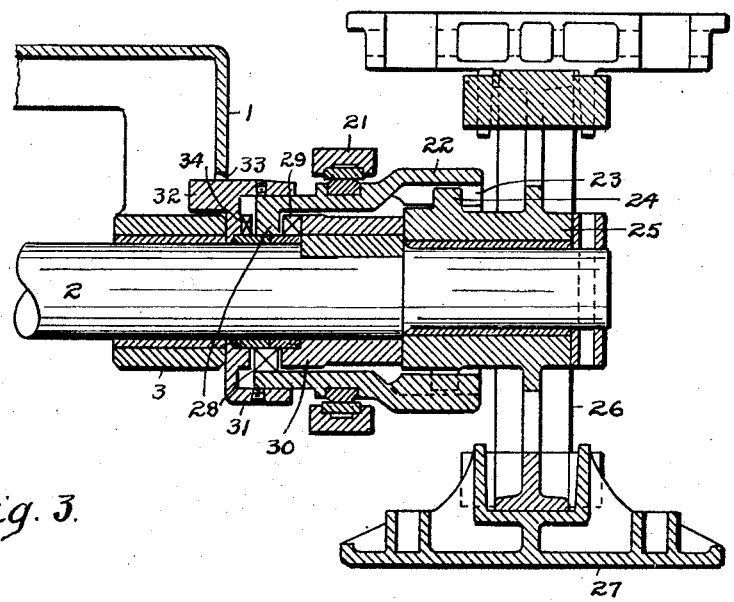
Figure 4:
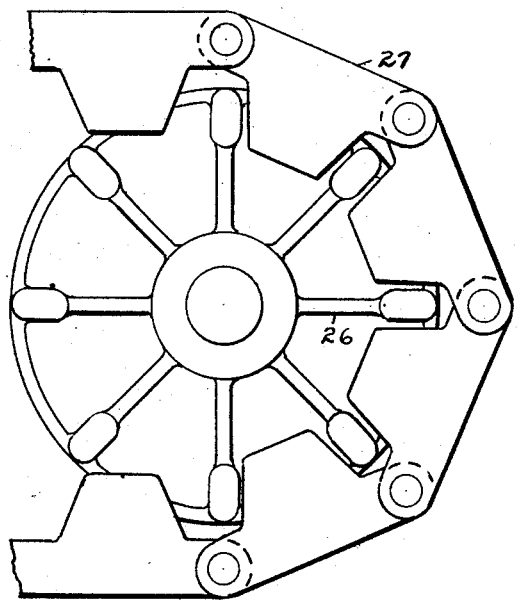

In the drawings, Figure 1 is a bottom view of the endless belt or crawler truck frame equipped with the invention; Fig. 2 is a side elevational view of a portion of the same partly in section; Fig. 3 a cross-sectional view of one end of the traction driving axle of the truck and clutch mechanism applied thereto; Fig. 4 is an elevational view of the endless belt or crawler driving wheel; Fig. 5 is a perspective view of the driving clutch; Fig. 6 is a perspective view of the double jaw clutch sliding sleeve; Fig. 7 is a perspective view of the double jaw clutch sliding sleeve taken at the end opposite to that shown in Fig. 6; Fig. 8 is a perspective view of the jaw clutch sleeve that is secured to the truck frame; Fig. 9 is a side view of the bushed crawler or endless belt driving wheel and Fig. 10 is a cross-section on line 10—10 of Fig. 9.

Referring to the illustrative embodiment of the invention, 1 indicates the truck frame and 2 indicates the driving axle that is revolubly mounted in suitable bearings 3 carried by the frame. A bevel gear 4 is secured to the axle preferably substantially intermediate its ends and is in mesh with a pinion 5 secured to a shaft 6 revolubly mounted on the frame. A bevel gear 7 is also secured to the shaft 6 and meshes with a pinion 8 that is secured to the lower end of a vertical shaft 9 revolubly supported by the deck 10, the deck being swiveled upon the truck frame. A gear 11 is secured to the upper end of the shaft 9 and is adapted to be engaged by a suitable source of power mounted on the deck for rotating the axle 2.

A horizontal gear 12 is revolubly mounted on the truck frame or is secured to the deck 10 and meshes with a pinion 13 that is secured to a shaft 14 revolubly mounted on the deck. A gear 15 is also secured to the shaft 14 and is adapted to be driven by a suitable source of power supported on the deck. A pin 16 is suitably engaged to the gear 12 and plungers 17, 17ª are mounted on the frame and extend in opposite directions from the pin, the pin being adapted to abut either of the plungers and reciprocate it longitudinally outward. Levers 18 are suitably connected to the plungers respectively, each lever being pivoted at 19 to the frame. The compression springs 20, 20ª oppose the outward movement of the plungers and levers. Each lever is forked at one end or is secured to a yoke 21 that suitably engages a double jaw clutch sleeve 22 for shifting the sleeve. The jaws 23 in the large end of the sleeve (Fig. 7) are adapted to engage between the lugs 24 formed on the hub 25 of the driving wheel 26 of the crawler mechanism or endless belt 27. The jaws 28 at the opposite end of the sleeve 22 are adapted to engage between the lugs 29 on a clutch member 30 keyed to the axle 2. A jaw clutch sleeve 31 is loosely mounted on the axle and is provided with a lug 32 that is received in an aperture 33 in the truck frame by which the sleeve may be locked to the frame. The jaws 34 of this sleeve 31 are adapted to engage between the jaws 28 of the sleeve 22 when the sleeve 22 is shifted toward the sleeve 31. Corresponding parts are provided at the opposite end of the axle.

When the machine is being moved, steering is accomplished by driving the pinion 13 in proper direction to rotate the gear 12 in the required direction for causing the selected plunger 17 to shift the selected double jaw clutch sleeve 22.

In Fig. 1 the sleeves 22 are in neutral position, the crawler driving wheels being free to rotate on the axle so that the machine may be towed. In this position of the sleeves 22 the jaws 28 of each are moved to a position intermediate the sleeve 31 and the clutch member 30, and pins 17<sup>b</sup> are passed through openings in the plungers and in the frame whereby the plungers are locked to the frame. Hence, the driving wheels are disconnected from the axle. When the machine is being self-propelled and the gear 12 is rotated clockwise, Fig. 1, the pin 16 abuts the plunger 17 and reciprocates that plunger outwardly whereby the sleeve 22 is moved toward the frame to disconnect the sleeve from the clutch 30 on the axle and thereby release the crawler driving wheel 26, the other clutch sleeve remaining in engagement with the clutch on the opposite end of the axle under the influence of the compression spring 20<sup>a</sup>. If the operator desires a long steering radius he will cause the sleeve 22 to move to the neutral point so that the adjacent crawler will idle. If he desires a short steering radius he will cause the sleeve 22 to move until its jaws 28 engage the jaws 34 in sleeve 31 that is engaged by the lug 32 in the aperture 33 in the frame and thereby lock the driving wheel 26 to the truck frame. The jaws on the hub are of sufficient length to ensure the engagement of the sleeve 22 thereon irrespective of the longitudinal position of the sleeve relatively to the axle. If the operator causes the gear 12 to rotate counter-clockwise the clutch sleeve associated with the other crawler mechanism is operated in a similar manner. Thus either steering on a long or short radius is readily accomplished.

When the gear 12 is returned to its normal position the compression spring 20 or 20<sup>a</sup> restores the clutch sleeve 22 to its normal position—that of engagement with the clutch member 30 on the axle.

The operator of the machine thus controls the direction of movement of the machine under its own power without assistance.

What I claim is:

1. In a device of the class described, a frame, a power driven axle revolubly mounted on the frame, a power driven gear, a propelling member at and revolubly mounted on each end of the axle, a double-jaw clutch mechanism adjacent to each propelling member and including a clutch member fixed to the frame, a clutch member fixed to the axle and a clutch member slidably mounted on the axle enclosing and slidably engaging drivable connections on the adjacent propelling member and adapted to engage either of the said fixed clutch members, and means operatively connected to the slidable clutch members and adapted to be operated by the gear when rotated for selectively shifting the latter members to connect either of said slidable clutch members to its associate clutch member fixed to the frame and means to cause the said slidable clutch members to normally engage the fixed clutch members on the axle respectively.

2. In a device of the class described, a frame, a one-piece axle revolubly mounted on the frame, a fixed clutch member on each side of the frame adjacent to the axle, a pair of fixed clutch members at each end of the axle one of which is mounted on the frame and the other on the axle between the said clutch member on the frame and the propelling member on said end of the shaft, a slidably mounted clutch member between the members of each said pair of fixed clutch members and slidably engaging the adjacent propelling member, levers pivotally mounted on the frame and connected to the sliding clutch members, resilient members normally causing the levers to engage the slidable clutch members to the fixed clutch members on the axle respectively, reciprocable plungers connected to the levers respectively and revoluble means adapted to selectively engage the plungers to cause either slidable clutch member to disengage from the clutch member on the axle and to engage the adjacent fixed clutch member on the frame or to move to a neutral point between said clutch members.

3. In a device of the class described, a frame, a power driven axle revolubly mounted on the frame, a power driven gear revolubly mounted on the frame, a propelling member at and revolubly mounted on each end of the axle, a double-jaw clutch mechanism adjacent to each propelling member and including a clutch member fixed to the frame, a clutch member fixed to the axle and a slidable clutch member on the axle enclosing and slidably engaging drivable connections on the adjacent propelling member, said slidable clutch member being adapted to engage either of the adjacent fixed clutch members, means operatively connected to the slidable clutch members and adapted to be actuated by the gear when rotated for selectively shifting the latter members into engagement with the fixed clutch members on the frame, and means to cause the slidable clutch members to normally engage the fixed clutch members on the axle respectively.

In witness whereof I have hereunto subscribed my name this 18th day of December, 1926.

CHARLES H. LOTTE.